United States Patent [19]
Shonebarger et al.

[11] 3,937,676
[45] Feb. 10, 1976

[54] LUBRICITY COATING FOR PLASTIC COATED GLASS ARTICLES

[75] Inventors: Francis J. Shonebarger, Lancaster; William Brown, Amanda, both of Ohio

[73] Assignee: Anchor Hocking Corporation, Lancaster, Ohio

[22] Filed: Oct. 7, 1974

[21] Appl. No.: 512,401

Related U.S. Application Data

[62] Division of Ser. No. 375,684, July 2, 1973, Pat. No. 3,864,151.

[52] U.S. Cl................ 260/23 R; 427/379; 427/407; 427/408; 260/42.41; 260/42.42; 260/94.9 GA
[51] Int. Cl.².......................................... C08L 91/00
[58] Field of Search........... 260/23 R, 42.42, 42.46, 260/94.9 GA; 117/69, 72

[56] References Cited
UNITED STATES PATENTS

| | | | |
|---|---|---|---|
| 2,275,957 | 3/1942 | Groff | 260/23 |
| 3,438,801 | 4/1969 | Schlientz | 117/69 |
| 3,525,636 | 8/1970 | Bogart | 117/72 |

*Primary Examiner*—M. J. Welsh
*Assistant Examiner*—William E. Parker
*Attorney, Agent, or Firm*—Wood, Herron & Evans

[57] ABSTRACT

A lubricity coating for glass articles which have previously been coated with an ionic copolymer of an alpha olefin and an alpha, beta-ethylenically unsaturated carboxylic acid. The preferred lubricity coating comprises calcium stearate and polyvinyl alcohol emulsified by an alkaline salt of oleic acid. The coating may be applied to the plastic coated articles as a water spray and can be dried by retained heat of the article. The coating is resistant to removal by water.

10 Claims, No Drawings

LUBRICITY COATING FOR PLASTIC COATED GLASS ARTICLES

This is a division, of application Ser. No. 375,684 filed July 2, 1973, now U.S. Pat. No. 3,864,151.

This invention relates to the treatment of glass articles such as bottles and jars which have been coated with a plastic skin to render them more resistant to shattering. In particular, the invention relates to means for increasing the "lubricity" of such plastic coated articles.

In the manufacture of glass containers, it has become a standard practice to apply what is known as a lubricity spray or coating to the outer surface of the article. A bare glass surface inherently has a rather high susceptibility to scratching, abrasion, etc. by glass-to-glass or glass-to-metal contact. Newly formed glass articles in particular are easily scratched, abraded or marred if they rub against one another or against the manufacturing or processing equipment. Such abrasion not only can damage the appearance of the article, it also reduces the article's resistance to breakage, and especially its resistance to rupture under internal pressure of a pressurized beverage. The application of a lubricity coating reduces the coefficient of friction on the article's surface and imparts a certain amount of slip or slickness to it which reduces this tendency to scratch. Such lubricity coatings are especially useful where containers are to be handled on a high-speed line, where the rapidity of motion subjects the containers to abrupt contacts which are particularly liable to cause injury to the glass surface. Indeed, the very high speeds at which modern bottle filling lines operate virtually require that the bottles be lubricity coated, in order to minimize bottle damage as well as clogging on the line.

In addition to imparting the desired lubricating quality, it is of course vital that any such coating must be virtually invisible, so as not to affect the appearance of the liquid contents of the bottle. Moreover, the coating must be acceptable under FDA regulations, by reason of its association with foodstuffs.

One lubricity material which has been widely used on pristine (bare or untreated) glass articles, disclosed in U.S. Pat. No. 2,995,533, comprises a low molecular weight polyethtylene emulsified with a potassium salt of a fatty acid such as oleic acid or stearic acid. The dilute emulsion is sprayed onto newly formed glass articles after they have been annealed, and then is dried to form the coating.

It is also known to apply a lubricity coating to glass containers which have first been given a metal oxide coating, e.g., a tin oxide or a titanate "hot end" coating. The application of a lubricity spray as an "overcoat" onto titanate coated ware is shown in U.S. Pat. No. 3,323,889, which teaches use of polyethylene wax emulsified by potassium oleate for that purpose.

Attention has recently been directed to the application of a plastic "shield" or coating on glass containers, as a means of maintaining the unabraded or as-formed strength of the article, reducing the danger of shatter upon impact, and reducing the glass content of a container of given internal volume. Such a plastic coating differs from a lubricity coating in that the plastic coating is relatively thick, typically about 3 to 15 mils; its purpose is not to lubricate the glass, but rather to act as a cladding or casing which will isolate or buffer the glass surface, and also to act as a wrapper to minimize any glass fragmentation such as might be caused by rupture under internal pressure of a carbonated beverage. Such plastic coatings may be applied by various known techniques, for example by plastisol dip, fluidized bed, dry spray, or by a shrink film as set forth in U.S. Pat. No. 3,604,584. It is required that such plastic coatings display qualities of tensile strength and abrasion resistance, and in these respects they differ both functionally and compositionally from lubricity coatings.

Although plastic coatings can significantly reduce the danger of shatter of the articles to which they are applied, they do not display a desirable degree of lubricity, and in fact plastic coatings that provide the better shatter resistant qualities tend to be somewhat "rubbery" and display a relatively high coefficient of friction. While the plastic shields the glass from abrasion, it exerts a relatively high drag on machinery, packaging and other surfaces across which it is moved. Resistance to sliding across equipment, packaging or another container causes undesirable scratching of the plastic coating itself, which is aesthetically undesirable. Moreover, the unlubricated bottles tend to collect dust particles.

It has been observed that the lubricity coatings which heretofore been possible to obtain on unshielded glass articles or titanate or tin oxide coated glass articles, do not generally provide adequate "permanence" if they are applied onto plastic shielded glass articles; that is, such coatings are undesirably removed by water contact. There has, therefore, been a need for a lubricity coating which can be applied onto a plastic coated glass article and which will provide in use adequate qualities of lubricity and permanence such as it has heretofore been possible to obtain on unshielded glass containers.

A standard technique for quantifying the lubricating quality of a lubricity coating involves measurement of the coefficient of friction of a glass container to which the coating has been applied. This measurement may be carried out with commercially available test apparatus known as an American Glass Research (AGR) lubricity tester. In accordance with the test, a coated bottle is placed on its side on top of two identical coated bottles that are lying side by side, so as to form a three-bottle pyramid. The two base bottles rest on a support which is hinged about a horizontal axis, so that the stack can be inclined gradually from the horizontal toward vertical, across a graduated scale. The angulation of the stacked bottles with respect to horizontal is gradually increased, and the angle is observed at which the uppermost container begins to slide downwardly along the other two on which it rests. The coefficient of friction (COF) is defined to be the tangent of this angle, and is taken as a measure of the comparative lubricity value of the coating. Thus, a bottle which starts to slip at an angle of 45° will have a COF value of 1.0 (tan 45°). A "slick" coating will slip at a low angle, and will therefore have a low COF value; thus, the higher the COF, the poorer the relative lubricity quality of the coating.

COF values are generally stated for empty bottles, both dry and wet ("wet" here meaning, rinsed for 5 seconds under tap water). The Glass Container Manufacturers' Institute (GCMI) has established a COF value of 0.36 as a maximum limit for standard beverage bottles which are to pass through standard filling lines, see "Classification and Testing of Lubricative Coatings for Glass Containers", G.C.M.I. Bulletin No. 63. To provide a margin of tolerance below that limit, it is preferable that in practice a coating have a COF of 0.30 or less, both in dry and in wet readings.

Apart from COF, a second important criteria of any lubricity coating is that of water resistance or permanence. A glass beverage container to which the lubricity coating is applied is usually rinsed preparatory to filling. A lubricity coating that would be removed by such rinsing as would be normal and incidental for the particular type of container to which it is applied, would be useless. Thus, there is particular need for a lubricity coating which after rinsing will still present an acceptably low COF rating.

Since paper labels may be expected to be applied to the plastic coated, lubricity coated, containers, it is important that the lubricity coating over which the label is to be placed be receptive to the label glue so that the label does not easily come off in use. Label acceptance may be measured by a fiber tear test, which measures the retention of paper fibers when glued on the coated surface in a defined manner. The results can conveniently be specified as pass or fail, depending upon whether a certain percent of the glued fibers are retained on the bottles.

A number of different polymers have been proposed for use as plastic coatings for containers. Among these are plastisols, as shown in U.S. Pat. No. 3,060,057, polyvinyl chloride, ethylene vinyl acetate, and others. Especially useful are the ionic copolymers of alpha olefins and alpha, beta - ethylenically unsaturated carboxylic acids, generally of the type described in U.S. Pat. No. 3,264,272. One such ionic copolymer material which is formed from ethylene and methacrylic acid is available commercially from DuPont under their trademark "Surlyn". This material in particular has been promoted in the market by reason of its clarity, its elasticity and its degree of adherence to the glass. As shown below, a given lubricity coating may work very well if applied over one type of plastic coating, but only poorly if applied over another. This invention is particularly directed to a lubricity coating which gives good results when applied to a coating of the general "Surlyn" type.

In accordance with this invention, a lubricity coating is provided which basically is comprised of the calcium or zinc salt of a fatty acid such as stearic acid or oleic acid, and emulsified by an alkaline oleate in a water solution of polyvinyl alcohol.

The fatty acids are of course well known for their lubricating quality. We have found, however, that calcium and zinc salts thereof are rather unique in their permanence as applied on a Surlyn type plastic coating; that is, they remain quite effective on the plastic after water rinse.

The preferred component is calcium stearate (abbreviated hereinafter as CaSt). This fatty acid salt is listed as being insoluble in water. Moreover, it tends to char upon melting, so that it is difficult to disperse as a liquid. The stearate or other fatty acid salt is emulsified with a potassium, sodium, or ammonium salt of oleic acid. The emulsifying agent is preferably formed in situ by reaction of the alkaline hydroxide with oleic acid. The amount of hydroxide used is such as to neutralize all of the acid and preferably to provide a slight excess of alkalinity.

The polyvinyl alcohol used is preferably a substantially cold water soluble form, e.g., 88% hydrolysed. One suitable PVA which is commercially available is "Elvanol" Grade 51–05, sold by DuPont. It has a viscosity of 4–6 cp, in 4% water solution at 20° C., as determined by the Hoeppler falling ball method. In the presence of the other components, the PVA improves the permanence of the lubricity (i.e., lowers wet COF) and improves labelability. Thus, the PVA and the calcium or zinc fatty acid salt are the lubricity components. The PVA/fatty acid salt weight ratio is desirably in the range of about 0.5–2, and preferably is 1.0.

The alkaline oleate is the primary emulsifying agent, and functions to keep the calcium or zinc fatty acid salt (which ordinarily would not form a stable emulsion in such a composition) in stable emulsion form for ease of application. The oleate effectively lowers the melting point of the fatty acid salt. The amount used is desirably somewhat in excess of that strictly necessary to emulsify the fatty acid salt.

The preparation of a lubricity coating from these components is preferably carried out by the following procedure: 1. The PVA is dissolved in hot water. 2. In a separate vessel the oleic acid is added to the calcium or zinc fatty acid salt and the mix is melted. 3. The resulting liquid is partially neutralized with alkali (potassium, sodium, or ammonium) hydroxide (if fully neutralized, an inconveniently stiff soap is formed). 4. The remaining hydroxide to be used for neutralization is added to the PVA solution. 5. The oleate/fatty acid salt solution is then added to the PVA-hydroxide solution under intensive stirring. It is believed that this forms an emulsion of calcium or zinc fatty acid salt droplets dispersed in the PVA solution.

The following proportions of ingredients, while not critical, are useful for preparing the composition.

1 part by weight fatty acid salt (e.g. CaSt)
about 0.5 to 2.0 parts soluble PVA
about 0.3 – 0.8 parts alkali hydroxide
about 1.5 – 3.0 parts oleic acid The hydroxide and oleic acid react to provide about 1.7–3.6 parts of the corresponding oleate in the composition itself.

The composition may be prepared as a concentrated water emulsion, and may be diluted by addition of water and applied as spray at a low solids content, for example about 1%.

It is important that the lubricity coating be applied at a temperature at which the underlying plastic coat is not so soft that impingement of the lubricity spray on it might roughen it. The Surlyn coatings are quenched by water flow to about 200° F. or less to avoid hazing, and the lubricity coating is preferably applied to the containers while they are in the temperature range of roughly 150° to 200° F. At temperatures above 200° F. it is found that the lubricity coating is apparently dissolved or absorbed in the plastic, and its effectiveness is reduced so that a heavier application is required to provide the same effect.

Coating density or weight per unit coated area does not appear highly critical, and (on a standard beverage bottle) coatings of about 0.1 to 0.2 mg/sq. in. are suitable. Such coatings do not significantly affect the color or transparency of the container, as viewed by the naked eye, but they very substantially reduce the coefficient of friction. It is an especially important feature of the invention that this coating, unlike others, very largely retains its effectiveness through storage, rinsing, filling and service.

It is recognized that it is known to use some-- but not all-- of the ingredients of the present three component composition, for certain purposes. U.S. Pat. No. 2,813,045 shows the use of polyoxyethylene stearate to produce a lubricious film on a glass surface. U.S. Pat. No. 2,833,718 shows a lubricating grease which is a mixture of polyethylene plus an alkali metal salt of a fatty acid, and an alkaline earth metal salt of a fatty acid. The resulting composition is used in high temperature, high shear lubricating conditions. U.S. Pat. No. 3,282,729 shows the use of a lubricity coating including polyvinyl alcohol on a plastic bottle. No fatty acid salts are present.

U.S. Pat. No. 3,392,117 shows use of a lubricity coating for metal and includes a calcium fatty acid soap such as the oleate, and potassium stearate. U.S. Pat. No. 3,438,801 shows coating a silicone treated glass surface by a mixture of an alkali metal salt of a fatty acid (potassium stearate), plus a polyethylene wax. U.S. Pat. No. 3,525,636 shows the use of a coating which is comprised of carnauba wax plus polyvinyl alcohol, plus the potassium salt of a fatty acid.

The following examples demonstrate the invention in comparison to tests of other materials.

Test 1

The lubricity of a bare glass container with no plastic coating or lubricity coating of any type, was measured on a standard AGR lubricity tester, in accordance with the method previously described. No accurate COF measurement could be obtained because the bottle tended to fall (rather than slip) at an angulation greater than 45°. This would indicate a COF value greater than 1.0.

Test 2

A standard 32 fl. oz. returnable glass beverage container was coated with "Surlyn". The plastic material in powder form was applied by an electrostatic dry powder spray process using a DeVilbiss Model No. 348, at 60 kv. D.C. output. For application of the plastic coating, the container was preheated to about 350°–360° F. (surface temperature, as measured by optical pyrometer). The sprayed, charged particles adhered to the grounded bottle and partially fused upon contact. The adherent particulate material was then cured or fused to a clear, smooth continuous film, by heating the bottle in an oven to a peak temperature of 390° F., over a 3 minute period. When tested in the manner set forth in Test 1, the Surlyn coated bottle--with no lubricity coating--demonstrated a COF value just slightly better than that of an uncoated container, measuring nonuniformly between 0.9 and more than 1.0. Such ratings grossly exceed the GCMI specification referred to above for containers to be handled on a standard filling line.

EXAMPLE A

This example demonstrates the presently preferred method of preparing a lubricity coating in accordance with the invention, and applying it as a spray to bottles moving on a conveyor.

A 60 ml portion of a 5% KOH solution (5 gms. of 95% pure KOH diluted to 100 ml with water) was mixed with 30 grams of "Elvanol" Grade 51–05 polyvinyl alcohol, in 700 ml of water. The mixture was heated to about 200° F. to dissolve the PVA.

Separately, 60 grams of oleic acid were mixed with 30 grams of calcium stearate and melted at about 230° F. until a clear liquid was obtained (the oleate lowers the effective melting point). After melting, an additional 240 ml of the 5% KOH solution were added slowly so that the temperature of the mixture was about 200° F. The KOH reacted with the oleic acid to form the acid salt, potassium oleate (KOl). The amount of KOH added at this stage was not sufficient to achieve full neutralization of the acid, which would have made too stiff a soap.

With both the first and second solutions at about 200° F., the second solution (CaSt - KOl) was poured into the first (PVA - KOH), while the latter was agitated vigorously in a liquid blender. This dispersed the stearate and formed CaSt-containing droplets in a PVA - water continuous phase. The total amount of KOH used was slightly in excess of that needed to react with the oleic acid. Mixing was continued until the temperature reached about 150° F. This yielded about 1000 ml. of dilutable emulsion concentrate with a solids content of about 13%.

In the foregoing reaction, 30 parts of PVA were incorporated with 30 parts of commercial purity calcium stearate. Also, 60 parts by weight of oleic acid were reacted with about 15 parts KOH. Converted to parts per part CaSt, the formulation was made from 1 part PVA, 2 parts oleic acid, and about 0.5 parts KOH. The acid and KOH yielded about 2.3 parts KOl per part CaSt in the emulsion. The emulsion was stable at room temperature, although it is desirable to agitate the drummed emulsion, as by rolling it, before dilution and use.

The emulsion concentrate made in the manner just described was diluted with water to a 1% solids content (1 part solids to 99 parts water). The dilute material was applied to glass beverage containers coated with Surlyn as set forth in Test 2. After furnace cure of the plastic coating, the bottles were air cooled to about 250°, then quenched with water flowing over them to about 200°, (surface temperature, as indicated by an infrared pyrometer) then dried by air blast unil surface temperature was in the preferred range of 160°–180° F. for spraying. The bottles were held suspended by chucks which shielded the finish portion and the mouth of each. The chucks moved on a continuous line at a rate of 32 bottles per minute, spaced on six inch centers.

The coating was sprayed from two spray guns, one of which was directed toward the upper contact point of the bottles so as to cover the upper half of the bottle, and the other of which was directed at the lower contact point and the base, so as to cover the lower half of the bottle. These sprays together consumed about 100 cc of the diluted coating emulsion per minute. Calculated at an assumed spray efficiency of about 50%, about 0.015 grams of solids were applied per bottle. The residual heat in the bottle was sufficient to cure the coating.

Tested by the method set forth in Test 1, the bottles with this coating displayed COF values of 0.20 (dry) and 0.24 (wet). As a more severe test of permanence, the container was given a standard dishwasher cycle (without detergent). After such washing COF was 0.33 dry and 0.31 wet, which values would qualify under the GCMI standard. The applied coating was rated as being of good clarity, and passed the labelability test with casein glue. Emulsion stability was rated good on a poor-fair-good scale.

EXAMPLE B

This example, and Examples C and D, show the effect of increasing the proportion of PVA in relation to the CaSt.

In this example, 5.4 grams of polyvinyl alcohol were used with 5 grams of calcium stearate, 10 grams of oleic acid, and 2.5 grams of potassium hydroxide (50 ml. of 5% soln) in 150 ml. water. This correspond to 1 part CaSt, 1.1 parts PVA, 2 parts oleic acid, and 0.5 parts KOH. The components were compounded and applied following the general manner set forth in Example A.

The initial dry and wet COF's of this composition were 0.18 and 0.21, respectively, but the same values after one dishwasher cycle deteriorated to 0.46 and 0.42 respectively. The emulsion stability was rated fair.

Test 3

By way of demonstrating the effect of the polyvinyl alcohol in the formulation, the composition of Example A was made but without any polyvinyl alcohol content. Proportions were 10 grams CaSt, 20 grams oleic acid, 5 grams KOH in 300 ml. water. The initial COF's were 0.22 dry and 0.24 wet, generally comparable to those of Example A, but after one dishwasher cycle they degenerated to 0.67 dry and 0.76 wet. This coating would by commercially unsatisfactory.

EXAMPLE C

A lubricity coating was prepared following the method of Example A, but using 22.5 grams polyvinyl alcohol, 15 grams of calcium stearate, 30 grams oleic acid, and 7.5 grams potassium hydroxide. In this example the ratios were 1 part CaSt, 1.5 parts PVA, 2 parts oleic acid and 0.5 parts KOH. Emulsion stability was fair.

EXAMPLE D

To demonstrate the utility of a still higher proportion of PVA in relation to CaSt, Example A was repeated but with 30 grams PVA. 15 grams calcium stearate, 30 grams oleic acid, and 7.2 grams potassium hydroxide, or a ratio of 1 part CaSt, 2.0 parts PVA, 2 parts oleic acid and 0.5 parts KOH. As applied, this coating showed an initial dry coefficient of 0.23, but the wet coefficient was 0.38. COF after washing was 0.33 dry and 0.33 wet. Emulsion stability was fair.

EXAMPLE E

In order to demonstrate the use of ammonium hydroxide as a substitute for potassium hydroxide, a composition was made up from 5 grams PVA, 5 grams calcium stearate, 10 grams oleic acid, and 8 ml. of concentrated $NH_4OH$ solution (28–30% $NH_3$) and 150 ml. water (1 part CaSt, 1 part PVA, 2 parts oleic acid, and 0.86 total parts hydroxide). The amount of hydroxide used was more than twice that necessary to neutralize the oleic acid. The initial dry and wet COF's were 0.21 and 0.24 respectively. After one dishwasher cycle these became 0.28 and 0.26 respectively. Clarity and emulsion stability were both good, but the material failed the labelability test.

EXAMPLE F

In this example zinc stearate was substituted for calcium stearate. The composition was made from 5 gms. PVA, 5 gms. zinc stearate, 10 gms. oleic acid, 2.5 gms. potassium hydroxide and 2 ml of concentrated ammonium hydroxide solution. The PVA/ZnSt ratio was 1.0 and the total amount of hydroxide (potassium and ammonium) was in excess of that necessary to neutralize the oleic acid. The mixture was emulsified in 200 ml. distilled water.

This composition gave exceptionally low initial COF's, 0.16 dry and 0.15 wet. These values dropped, after one dishwasher cycle, to 0.35 and 0.28 wet. Clarity was good, and emulsion stability was rated fair. The composition did not pass the labelability test.

Test 4

As a comparison, a polyethylene wax coating of the type shown in Pat. No. 2,995,533, available commercially under the name "Duracote", was applied to a container that had first been plastic coated in the manner of Test 2. This was applied as a water spray, and provided virtually no benefit. COF was 0.9 or more both dry and wet.

Test 5

A container coated with plastic in accordance with Test 2 was given a coating of polyvinyl alcohol solution alone, without other components. The PVA was in the proportion of 0.22 grams per 100 ml. water (the same proportion as present in the preferred composition in accordance with this invention). The COF of the dry coating was greater than 1, and that of the wet coating was 0.64. From this it is apparent that polyvinyl alcohol alone does not have any significant lubricity value on the Surlyn coating.

Test 6

A container having a plastic coating in accordance with Test 2 was sprayed with a mixture of polyvinyl alcohol solution plus potassium oleate, but without calcium stearate. This composition comprised 0.22 grams polyvinyl alclhol and 0.50 grams of potassium oleate, per 100 ml. water, approximately the same proportions as those components are present in the preferred embodiment of this invention. This container had a COF of 0.72 dry and 0.73 wet. By reference to Test 5, it can be seen from this that the combination of polyvinyl alcohol and potassium oleate is no better than the use of polyvinyl alcohol alone, and does not afford nearly the results obtained by use of the polyvinyl alcohol, potassium oleate and calcium stearate in triple combination.

Test 7

A plastic coated container in accordance with Test 2 was treated with a mixture of polyvinyl alcohol and potassium stearate (rather than calcium stearate). The proportions of ingredients were 0.22 gms. PVA, 0.22 gms. stearic acid, and 0.06 gms. KOH in 100 ml. water. The COF values were 0.37 dry and 0.33 wet. After one dishwasher cycle at 130 degrees, COF degraded to 0.66 dry and 0.57 wet.

Test 8

Surprisingly, the composition of this invention does not have a permanent lubricating effect when used on bare glass (glass that has not been plastic coated). When the composition of Example A is applied to bare glass, preheated to 250°, it demonstrated an excellent dry COF of 0.10. However, it was readily removed upon rinsing, and the wet COF went to more than 1.0.

It is believed that the lubricity coating with calcium or zinc salts forms a bond to the underlying Surlyn coating. In particular, it is believed that the calcium and/or zinc may substitute for the sodium ionic cross-linker present in the Surlyn so as to form a chemical bond. This would account for its good wet permanence on plastic coated bottles, but not on bare bottles.

Test 9

The specificity of this lubricity coating for plastic coatings of the Surlyn type is shown by the following. A bottle was coated with a polyvinyl chloride plastisol plastic coating, commercially available from G & S Plastics under the designation "PLASTISOL No. 2342." When the coating in accordance with Example A was applied over this, COF measured 0.60 dry and 0.49 wet.

Similarly, when the present lubricity coating was applied over bottles coated with an ethylene vinyl acetate coating sold by Koppers Company under their designation "Dylan WPD-205," COF dry measured 0.9 and higher, and 0.57 wet.

Test 10

In general, a wide variety of other lubricity coatings that are standard for use on glassware which is not plastic coated, do not provide good results when used on Surlyn. Below is a listing of various commercially available materials, and their respective wet and dry lubricity values.

| Coating | COF Dry | COF Wet |
|---|---|---|
| Luball | .19 | .65 |
| Carbowax 4000 | .34 | >1.0 |
| Carbowax 1000 | .51 | >1.0 |
| Silicone 4010 | .30 | .29 |
| Polyoxyethylene monostearate | .32 | .60 |
| Carnauba wax, PVA, and oleate (Cf. patent 3,525,636) | >1.0 | .45 |

(Luball is a neutral potassium salt of whole corn oil; Carbowax 4000 and Carbowax 1000 are polyethylene glycols having molecular weights of about 4000 and 1000 respectively; and Silicone 4010 is an oil-in-water emulsion of a short chain linear polymer of di- or mono-methylsiloxane.)

Test 11

Calcium stearate is not soluble in water, and thus cannot be applied as a water solution. It is slightly soluble in alcohol. As a comparison of its lubricity value when used alone, a bottle was dipped into a coating bath of 2.5 grams calcium stearate per 500 ml. denatured alcohol, at 130°. COF dry was 0.42 and 0.37 wet. After one dishwasher cycle, COF was 0.53 dry and 0.57 wet.

Test 12

When the preferred composition is applied at temperatures in the range of 125° to about 150°, good lubricity values are obtained, but the composition is not as permanent when wetted. The preferred range of coating is about 160° to 180° F. If applied at temperatures greater than about 200° F., there is substantial danger that the Surlyn will haze, which impairs its clarity. Thus, a range of about 150°–200° is generally useful, but a range of 160°–180° F. is preferred.

EXAMPLE G

In this example calcium oleate was used as the fatty acid salt. The composition was made by generally following the procedure set forth in Example A, with 10 grams calcium oleate, 10 grams of PVA, 20 grams oleic acid, 100 ml. of 5% KOH solutin and, 400 additional grams of water.

In terms of parts per part of the CaOl, there was 1.0 part PVA, 2.0 parts oleic acid, and 0.5 parts hydroxide per part of salt. This material demonstrated a dry COF of 0.30, and a wet COF of 0.27. After the dishwasher cycle, dry COF was 0.49, and wet COF was 0.48. Emulsion stability was very good and labelability was good.

Test 13

The composition of Example G was duplicated, but with smaller proportions of emulsifying agent, by using for each part of calcium oleate, 1 part PVA, 0.5 parts oleic acid, and 0.12 parts of KOH. This composition gave a very high COF value of 0.93 dry and 0.80 wet.

Test 14

A plastic coated container in accordance with Test 2 was coated with a mixture of one part calcium oleate and one part PVA in water. COF values were <1.0 dry, and 0.83 wet. This demonstrates the need for the alkali oleate as a third component of the composition.

Test 15

Attempts to use magnesium stearate or an aluminum stearate in lieu of the calcium or zinc fatty acid salts produced a mixture which did not make a satisfactory emulsion. Large solid particles were present, and even after these had been removed by a strainer, the resulting emulsion displayed a COF of 0.37 dry but 0.62 wet.

While the foregoing examples demonstrate various specific forms of the invention, it will be understood that the invention is susceptible of other forms and variations, within the scope of the following claims.

We claim:

1. A lubricity coating material in water emulsion form and having a solids content consisting essentially of,
    1 part by weight of a member of the group of salts consisting of calcium stearate, zinc stearate, calcium oleate, zinc oleate, and mixtures thereof,
    about 0.5 to 2 parts of a soluble polyvinyl alcohol,
    and about 1.7–3.6 parts of an oleate of the class consisting of potassium, sodium, and ammonium oleates, and mixtures thereof.

2. The material of claim 1 wherein said member of said group of salts is calcium stearate.

3. The material of claim 1 wherein said alcohol is 88% hydrolysed.

4. The material of claim 1 wherein said oleate of said class is potassium oleate.

5. The material of claim 1 consisting of 1 part by weight of calcium stearate, about 1 part by weight of polyvinyl alcohol, and about 2.3 parts of potassium oleate.

6. A water emulsion comprising,
    1 part by weight of a salt of the group consisting of calcium stearate, zinc stearate, calcium oleate, zinc oleate, and mixtures thereof;
    about 0.5 to 2 parts of a soluble polyvinyl alcohol,
    about 1.5 to 3 parts of oleic acid, and about 0.3 to 0.8 part of a hydroxide of the group consisting of potassium, sodium, and ammonium hydroxides, and mixtures thereof.

7. The emulsion of claim 6 wherein said salt is calcium stearate.

8. The emulsion of claim 6 wherein said hydroxide is potassium hydroxide.

9. The emulsion of claim 6 wherein said polyvinyl alcohol is about 88% hydrolysed.

10. The emulsion of claim 6 wherein said lubricity coating comprises,
   1 part by weight of calcium stearate,
   about 1 part by weight of 88% hydrolysed polyvinyl alcohol,
   about 2 parts oleic acid,
   about 0.5 part potassium hydroxide,
   and water.

* * * * *